TRANSISTOR FIELD TIME BASE DEFLECTION CIRCUIT

Filed Oct. 29, 1962 2 Sheets-Sheet 1

INVENTOR
BRIAN E. ATTWOOD
BY Frank R. Trifari
AGENT

Jan. 11, 1966 B. E. ATTWOOD 3,229,151

TRANSISTOR FIELD TIME BASE DEFLECTION CIRCUIT

Filed Oct. 29, 1962 2 Sheets-Sheet 2

INVENTOR
BRIAN E. ATTWOOD
BY Frank R. Trifari
AGENT

United States Patent Office 3,229,151
Patented Jan. 11, 1966

3,229,151

TRANSISTOR FIELD TIME BASE DEFLECTION CIRCUIT

Brian Ernest Attwood, Burstow, near Horley, Surrey, England, assignor to North American Philips Company, Inc., New York, N.Y., a corporation of Delaware Filed Oct. 29, 1962, Ser. No. 233,670
Claims priority, application Great Britain, Nov. 2, 1961, 39,267/61; June 27, 1962, 24,704/62
13 Claims. (Cl. 315—27)

This invention relates to field time base circuits comprising in combination a transistor amplifier output stage, a charge network including a capacitor for supplying a saw-tooth stroke drive to said transistor, an oscillator having a discharge circuit connected across said capacitor for periodically discharging the capacitor during flyback periods which discharge circuit employs as its switching element a semi-conductor device, a D.C. coupling from the said charge network to the base of the output transistor which D.C. coupling is adapted to transfer substantially unaltered the voltage level and voltage drive waveform, a direct symmetrically-conductive D.C. connection extending from said oscillator circuit to said charge network and forming part of said discharge circuit, means including said discharge circuit and D.C. coupling for clamping the base voltage of the output transistor at the beginning of each stroke to a fixed voltage level, a residual voltage equal to the voltage drop occurring across said discharge circuit at the start of the stroke due to current flow through said discharge circuit at the end of the preceding flyback.

A transistor deflection circuit arrangement using D.C. coupling is known from U.S. patent specification 2,913,-625.

The D.C. coupling described in that patent specification has several advantages namely:

(1) The circuit is substantially independent of variations in temperature;

(2) The sensitivity of the circuit is improved; and (3) Less current is needed from the supply source.

There is however one difficulty in that there remains a residual voltage at the start of the stroke due to the fact that the resistance of the discharge network is not zero during flyback.

Because there is a D.C. coupling between the charge network and the output transistor, the residual voltage is also applied to the output transistor, thus controlling the output transistor at the beginning of each stroke. Thus there is already flowing a current through said output transistor at the beginning of each stroke, whereas no current at all should flow at that moment. Thus D.C. power is wasted and the dissipation of the output transistor increases.

In order to obviate this difficulty the circuit arrangement in accordance with the invention is characterized in that said damping means includes a winding inserted in series in the discharge circuit and means for inducing in said winding flyback pulses of such polarity and amplitude as to at least substantially cancel the residual voltage during the flyback periods. Since the function of this winding is to reduce or "back-off" the residual voltage, the winding will be referred to hereinafter as a "backing-off" winding.

Another advantage of the backing-off winding in accordance with the invention is that a better cut-off of the output transistor during flyback time is possible. When only a charge and discharge network is used and the charge network is D.C. coupled with the output transistor, the voltage at the input electrode of the output transistor does not reach the level for cutting off said transistor during flyback time. By giving the backing-off winding the proper number of turns the amplitude of the pulse obtained from said backing-off winding can be made greater than the value of the residual voltage thus ensuring a proper cut-off of the output tarnsistor during flyback time.

A specific embodiment of the invention will now be described by way of example with reference to the accompanying drawing in which.

Figure 1:
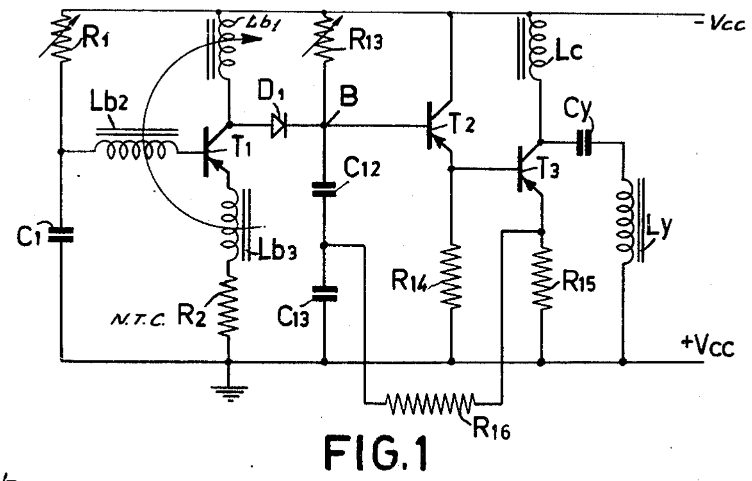
FIGURE 1 shows a first embodiment of a circuit arrangement with a transistor blocking oscillator having the backing-off winding in its emitter lead.

In FIGURE 1, the sawtooth voltage for controlling the output transistor T3 is developed by means of a charging network consisting of resistor R13 and capacitors C12 and C13. The discharge network consists of diode D1 and the transistor T1 connected as a blocking oscillator together with the transformer windings L$b$1 and L$b$2 and the network consisting of resistor R1 and capacitor C1. By means of resistor R1 the frequency of the sawtooth voltage developed with the aid of said charge and discharge network can be controlled. By means of resistor R13 the amplitude of said sawtooth voltage can be adjusted. The diode D1 is included in the circuit to improve the charging function of the network. Without diode D1 the leakage current of the transistor T1, during the time said transistor is blocked, tends to distort the sawtooth voltage developed across capacitors C12 and C13.

As mentioned in the preamble, the charge network should be D.C. coupled with the output transistor. Therefore, point B of the charge network is directly connected with the base of the driver transistor T2. This driver transistor is connected as an emitter follower and for this purpose the resistor R14 is connected in the emitter lead of transistor T2. The emitter of driver transistor T2 is again directly connected to the base electrode of the output transistor T3 thus ensuring the D.C. coupling between the charge network and the ouput transistor.

As mentioned in the preamble, one of the advantages of the D.C. coupling is that the circuit is practically independent of temperature variations. This is due to the fact that both transistors T2 and T3 are controlled by means of a voltage at their base electrodes. Thus the mutual conductance $$\left(\frac{di_c}{dv_b}\right)$$

of transistors T2 and T3 determines the amplification thereof. Now the mutual conductance of a transistor is less dependent on the temperature than is the factor $$\alpha'=\frac{ic}{ib}$$

To ensure, however, that transistor T3 also is controlled by a voltage, the driver transistor T2 is connected as an emitter follower so that the output impedance of said driver transistor is much smaller than the input impedance of transistor T3, thus ensuring that the voltage across resistor R14 determines the control of transistor T3. In the collector circuit of output transistor T3 there is connected the series connection of a coupling capacitor $C_y$ and the deflection coil $L_y$ together with the choke Lc which can be thought to form an additional inductive load for the output transistor T3.

In the emitter lead of transistor T3 there is included a resistor R15 for feedback purposes. In this way a current feedback is provided for the output transistor itself and through resistor R16 there is provided a voltage feedback to the junction of capacitors C12 and C13. The feedback through the resistor R16 is to improve the linearity of the sawtooth voltage developed in the charge and discharge network.

Figure 2:
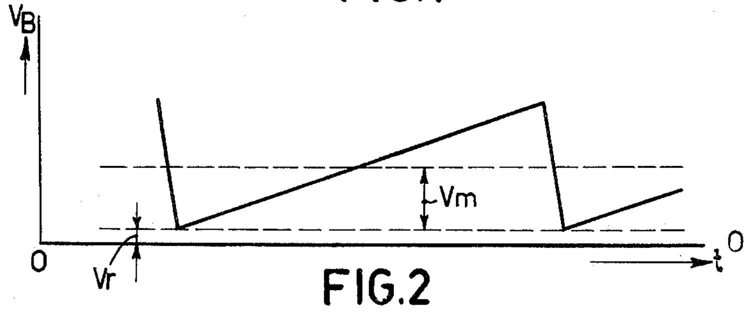
FIGURE 2 shows the voltage as developed by the charge and discharge network.

When first neglecting the winding L*b*3 and the emitter resistor R2, which is a resistor with a negative temperature coefficient for the purpose of compensating temperature variations in transistor T1, the occurrence of the residual voltage V*r*, as mentioned in the preamble will now be explained. During flyback time the transistor T1 and the diode D1 are brought into the conductive state so that capacitors C12 and C13 can discharge through diode D1, transistor T1 and resistor R2. Because these elements have a certain resistance value, the capacitors C12 and C13 cannot completely discharge so that a residual voltage V*r* remains. At the end of the flyback period, transistor T1 and diode D1 are blocked again and capacitors C12 and C13 are charged again through the resistor R13. The sawtooth voltage thus developed will start from a residual voltage V*r*, as shown in FIGURE 2. Because point B is D.C. coupled with transistor T3 this transistor will already draw some current at the beginning of a stroke indicated by the incleaning line of the sawtooth voltage as shown in FIGURE 2. The voltage V*m* in FIG. 2 is the mean voltage of the sawtooth voltage developed at point B. Therefore, $Vm+Vr$ represents the D.C. component of the sawtooth voltage at point B. However, the current through output transistor T3 should be zero at the beginning of a stroke because otherwise D.C. current is wasted, thus increasing the dissipation of transistor T3. As will also be clear from FIGURE 2, the control voltage obtained will not cut off the output transistor T3 sufficiently during flyback time.

In order to obviate these difficulties a backing-off winding L*b*3 is included in the emitter lead of transistor T1. This backing-off winding is magnetically coupled with the transformer windings L*b*1 and L*b*2 in such a manner that a voltage pulse is developed therein of the opposite polarity to the residual voltage V*r*. Thus this voltage can ensure that no residual voltage is left as the control voltage applied to transistor T3 so that no current will flow through output transistor T3 at the beginning of the stroke and that also a proper cut-off of the output transistor T3 is ensured.

Figure 3:
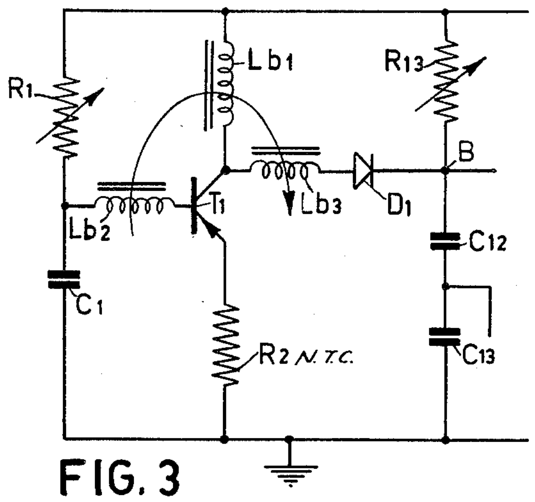
FIGURE 3 shows a blocking oscillator with the backing-off winding connected to the collector electrode of the transistor.

In FIGURE 3 there is shown a blocking oscillator which is only slightly changed with respect to the blocking oscillator as shown in FIGURE 1. Here the backing-off winding L*b*3 is connected between the anode of diode D1 and the collector of transistor T1. The operation of said backing-off winding is identical to that of the winding L*b*3 in FIGURE 1 because it is only necessary that the backing-off winding L*b*3 has the proper number of turns and that it is included in the discharge path of the transistors C12 and C13.

Figure 4:
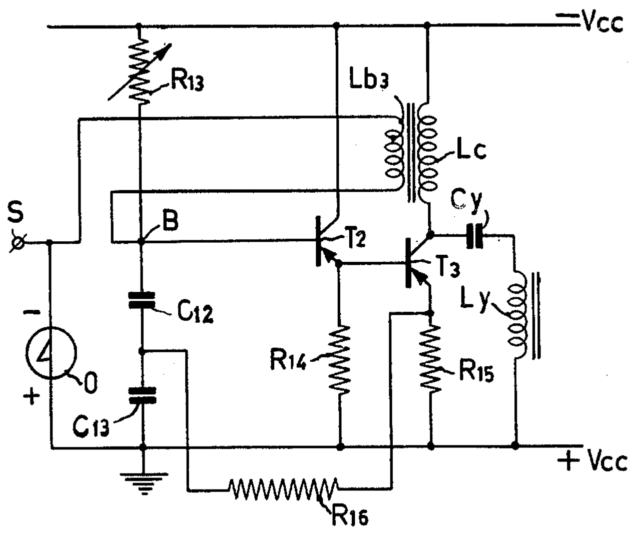
FIGURE 4 shows a further embodiment of the circuit arrangement with a four-layer diode as a switching element.
Figure 5:
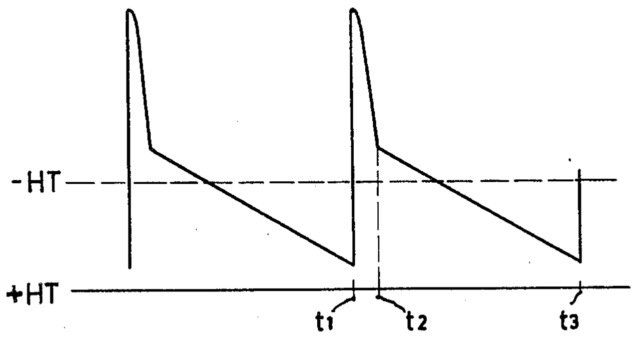
FIGURE 5 shows the voltage across the inductive load in the collector circuit of the output transistor.

Another embodiment of a circuit arrangement in accordance with the invention is shown in FIGURE 4. Here the blocking oscillator is replaced by a four-layer diode O which is used as a switching device and which is controlled by means of synchronization impulses which are applied to terminal S. This four-layer diode O is brought into the conductive state each time an impulse is applied to terminal S, thus discharging capacitors C12 and C13 which are charged through resistor R13. Because there is no blocking transformer in the circuit, the backing-off winding L*b*3 is coupled with a choke Lc in the collector lead of output transistor T3. The voltage developed across the load Lc is shown in FIGURE 5. As will be seen from this figure, a pulse is developed during the flyback time *t*1–*t*2. This pulse is induced in the backing-off winding L*b*3 which is now magnetically coupled with the choke Lc and which is connected between capacitor C12 and four-layer diode O. It will be clear that the desired pulse can be obtained by giving winding L*b*3 the proper number of turns and by winding it in the desired direction so that the polarity of the pulse is opposite to the polarity of the residual voltage V*r*.

A practical set of values and components for the arrangement of FIGURE 4 is given below by way of illustration for a field time base circuit of a 405 line or 625 line television receiver capable of giving 110° deflection with a 16 kv. beam.

*Table*

H.T. voltage (V*cc*)=15 volts
Transistor T2=Mullard Type OC 81
Transistor T3=Mullard Type OC 28
Resistor R13= 2 kΩ
Resistor R14=180Ω
Resistor R15=3.3Ω
Resistor R16=50Ω
Capacitor C12=100 μf. for 110° deflection
Capacitor C13=25 μf. for 110° deflection
Capacitor C*y*=1000 μf.
Choke L*c*=200 mh. at 400 ma.; 0.95Ω
Coils L*y*=21 mh.; 9Ω
L*b*3=20 turns, about 0.5Ω

In this case the values of V*r* and V*m* are about 0.3 volts and 1.5 volts, respectively (the value V*m* is the mean voltage of the sawtooth voltage as shown in FIGURE 2).

Although the value (typically 0.3 volt) of the residual voltage V*r* is small compared with the sawtooth voltage swing, this voltage would be sufficient to cause a material amount of wasted D.C. current to flow through transistor T3. This may, for example, be as much as 15% or 20% of the total collector current of transistor T3, and would be even more if the value of resistance R15 was reduced (wasted D.C. current flows also through T2 but is much smaller).

It should be noted that the emitter resistance R15 is not essential in all cases but, as mentioned above, its use is advantageous.

Although in all the figures the driver transistor T2 is shown, it will be clear that this driver transistor can be omitted when the amplification of the output transistor T3 is sufficient to obtain the desired amplitude for the sawtooth current through the deflection coil $L_y$. Without the transistor T2 the base of transistor T3 can be directly connected to the point B.

By reducing or eliminating V*r*, not only is the wasted D.C. curernt removed or reduced in transistor T3, but there is the additional important advantage that the effects of variations in the component and transistor spreads on the standing current (due to V*r*) will be reduced to negligible proportions due to the aiding effect of the curvature of the driver and output transistor *Vbe/Ic* characteristics. This is particularly important where mass production techniques are used for the manufacture of television receivers since individual instrument inspection for correct operation is unnecessary, it being sufficient to use the normal height, "hold" and linearity adjustments with mere visual checking.

In the arrangement of FIGURE 2 and with V*r* backed off to zero, a certain non-linearity of scan could arise in a special condition where an output transistor with very high $I_{co}$ (leakage current) is used and a very high temperature is encountered. Even under these extreme conditions no more than about 5% of the start of scan would be affected and, since a television picture tube is normally overscanned by 5%, this non-linearity would not be visible. This non-linearity arises due to the leakage current flowing in the base circuit of the output transistor and has the effect of biasing the emitter of T2 negative (thus this does not arise if stage T2 is absent). If under critical conditions it is considered unacceptable for this non-linearity to occur in any one receiver, then a simple bridge network may be used to make the emitter of T2 positive so that conduction again occurs. Such a capacity-resistance network is connected between the junction of C1–R1 and the emitter of T2 and may consist of a 10 μf. capacitor in series with a resistor of 820Ω.

What is claimed is:

1. A deflection circuit for producing a sawtooth current having a stroke period and a flyback period in a deflection coil comprising, a transistor amplifier output stage having an input and an output electrode, a charge network including a capacitor for deriving a sawtooth drive voltage for said output stage, a discharge circuit connected across said capacitor comprising a semiconductor switching element for periodically discharging said capacitor during the flyback period to a residual voltage level equal to the voltage drop across said discharge circuit at the end of the flyback period, means providing a direct-current connection from said charge network to said transistor input electrode for supplying said sawtooth voltage thereto, winding means serially connected in said discharge circuit, means for inducing a flyback voltage pulse in said winding means having an amplitude and polarity to cancel at least a portion of said residual voltage during the flyback period, said discharge circuit comprising means providing a direct-current connection between said discharge circuit and said charge network whereby said transistor input electrode is clamped to a voltage level at the beginning of a stroke period which is less than said residual voltage level, and means for coupling said deflection coil to said transistor output electrode.

2. A circuit as described in claim 1, wherein said means for inducing a flyback pulse in said winding means comprises an inductance element connected to said transistor output electrode and inductively coupled with said winding means.

3. A circuit as described in claim 1, wherein said switching element comprises a free-running transistor blocking oscillator having second winding means magnetically coupled to said winding means for inducing therein said flyback pulse.

4. A circuit as described in claim 1, wherein said direct-current connection between said discharge circuit and said charge network comprises a diode poled to conduct during the discharge time of said capacitor.

5. A deflection circuit for producing a sawtooth current having a stroke period and a flyback period in a deflection coil comprising, a transistor amplifier output stage having an input and an output electrode, a source of direct current voltage, a charge network for deriving a sawtooth voltage comprising a capacitor and resistor connected in series with said voltage source, a transistor oscillator circuit having a discharge circuit connected across said capacitor for periodically discharging said capacitor during the flyback period to a residual voltage level equal to the voltage drop across said discharge circuit at the start of the stroke period due to current flow through said discharge circuit at the end of the preceding flyback period, means providing a direct-current connection from said charge network to said transistor input electrode for supplying said sawtooth voltage thereto, a back-off winding serially connected in said discharge circuit, means coupled to said back-off winding for inducing therein a flyback voltage pulse having an amplitude and polarity to at least substantially cancel said residual voltage during the flyback period, said discharge circuit comprising a direct-current connection from said oscillator circuit to said charge network whereby said transistor input electrode is clamped to a voltage level at the beginning of a stroke period which is less than said residual voltage level, and means for coupling said deflection coil to said transistor amplifier output electrode.

6. A circuit as described in claim 5, wherein said output transistor includes an emitter electrode and a resistor connected in series therewith for developing a feedback voltage, said charge network comprising first and second capacitors serially connected to form a common junction point, and a feedback path from said resistor to said common junction point of said capacitors.

7. A circuit as described in claim 5, wherein said direct-current connection means from said charge network to said output transistor input electrode comprises an emitter-follower stage including a transistor of the same conductivity type as the output transistor.

8. A circuit as described in claim 5, comprising means directly connecting said charge network to said input electrode of said output transistor.

9. A circuit as described in claim 5, wherein said deflection coil is capacitively coupled to said output electrode of said output transistor.

10. A deflection circuit for producing a sawtooth current having a stroke period and a flyback period in a deflection coil comprising, a transistor amplifier output stage having an input and an output electrode, a charge network including a capacitor for deriving a sawtooth drive voltage for said output stage, a transistor having a base, emitter and collector electrode, a first winding connected to said collector electrode, a second winding connected to said base electrode and inductively coupled to said first winding to form a blocking oscillator, a discharge circuit connected across said capacitor for periodically discharging said capacitor during the flyback period and which includes the emitter-collector path of said transistor blocking oscillator, said discharge circuit developing a residual voltage level equal to the voltage drop across said discharge circuit at the start of the stroke period due to current flow through said discharge circuit at the end of the preceding flyback period, means providing a direct-current connection from said charge network to said output transistor input electrode for supplying thereto substantially unaltered the voltage level and the sawtooth voltage waveform of said charge network, a back-off winding serially connected in said discharge circuit and inductively coupled to at least one of said first and second windings, said discharge circuit comprising a direct-current connection coupling said emitter-collector path to said charge network whereby said output transistor input electrode is clamped to a fixed voltage level at the beginning of a stroke period which is equal to said residual voltage, said back-off winding having induced therein a flyback voltage pulse having an amplitude and polarity to at least substantially cancel said residual voltage during the flyback period, and means for coupling said deflection coil to said output transistor output electrode.

11. A circuit as described in claim 10, wherein said back-off winding is connected to said emitter electrode in series with said emitter-collector path.

12. A circuit as described in claim 10, wherein said back-off winding is connected to said collector electrode in series with said emitter-collector path.

13. A circuit as described in claim 10, further comprising a source of direct current voltage, a resistor and capacitor serially connected across said voltage source and having a common junction point, and wherein said direct-current connection means from said charge network to said output transistor input electrode comprises an emitter-follower stage including a transistor of the same conductivity type as the output transistor, said emitter-follower transistor having an emitter electrode to which a resistor is connected, and means directly connecting said last-named emitter electrode to the input electrode of said output transistor, means connecting said second winding between said common junction point and said transistor base electrode, and a series connected resistance-capacitance network connected between said common junction point and the emitter electrode of said emitter-follower stage.

References Cited by the Examiner

UNITED STATES PATENTS 2,913,625 11/1959 Finkelstein -------- 307—88.5 X

DAVID G. REDINBAUGH, *Primary Examiner.*

ARTHUR GAUSS, *Examiner.*